United States Patent

[11] 3,607,604

| [72] | Inventor | Robert D. Nava<br>73 South Lodge Lane, Lombard, Ill. 60148 |
|---|---|---|
| [21] | Appl. No. | 878,050 |
| [22] | Filed | Nov. 19, 1969 |
| [45] | Patented | Sept. 21, 1971 |

[54] FLAME ARRESTER AND PRESSURE RELIEF
12 Claims, 12 Drawing Figs.

[52] U.S. Cl. ............................................. 161/161,
161/162, 161/168, 161/403
[51] Int. Cl. ............................................. B32b 3/12,
B32b 17/00
[50] Field of Search ............................................. 161/160,
161, 162, 168, 403

[56] References Cited
UNITED STATES PATENTS

| 2,996,419 | 8/1961 | Schmick | 161/168 |
| 3,031,046 | 4/1962 | Hoadley | 161/161 |
| 3,108,924 | 10/1963 | Adie | 161/403 |

*Primary Examiner*—William J. Van Balen
*Attorney*—Hume, Clement, Hume & Lee

ABSTRACT: The explosionproof enclosure of the invention has high performance characteristics in the functional area of flame arrest and pressure relief. The flame arrester which also functions as a pressure relief and water seal for the enclosure may be fabricated by bonding a top and bottom laminate to an interlaminate which is porous in a direction parallel to the top and bottom laminates. More particularly the interlaminate may be formed of a plurality of spheres so disposed in contacting relation as to provide a flame path between the environment within the enclosure and the atmosphere outside the enclosure.

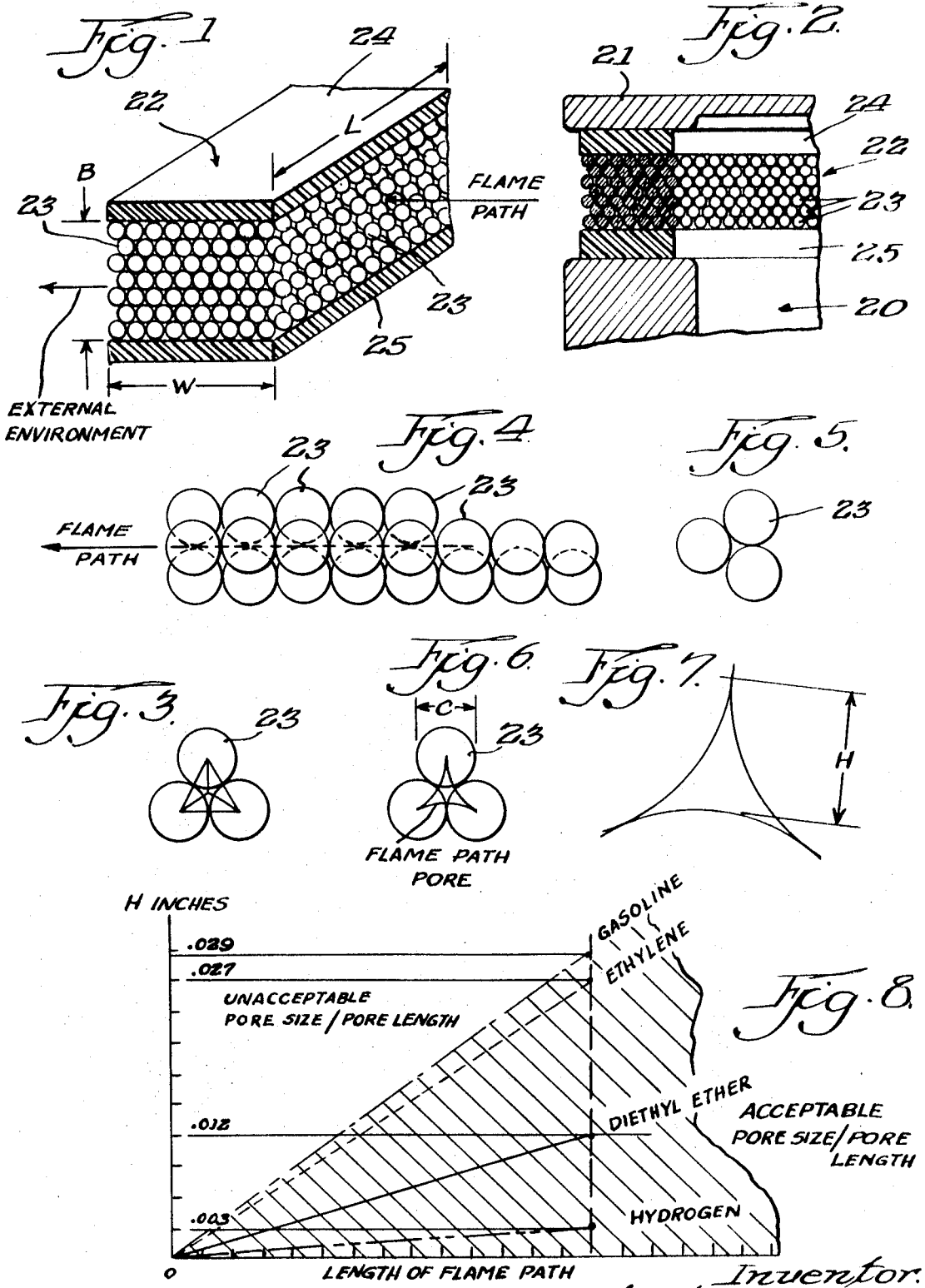

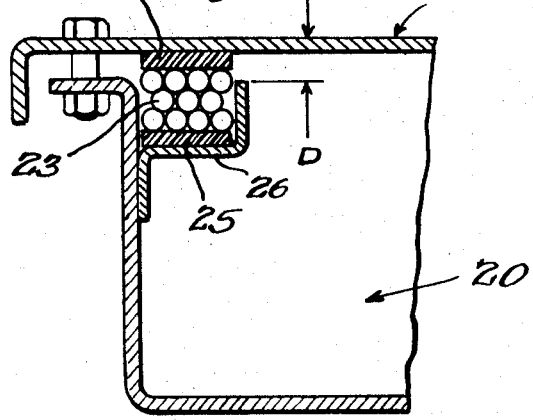
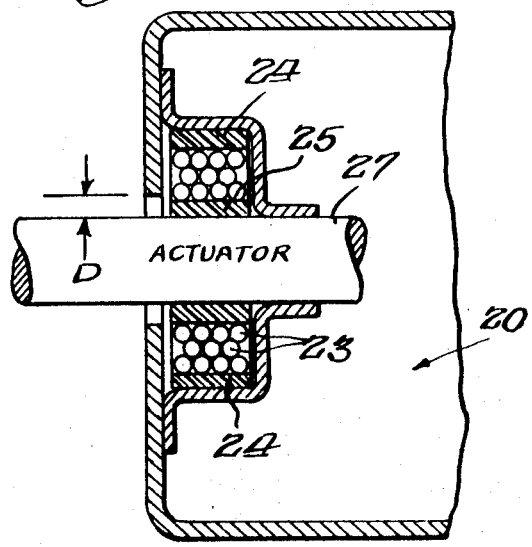
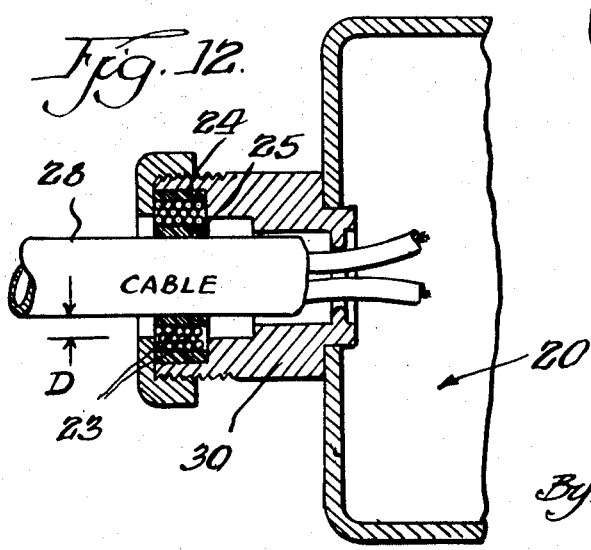

FLAME ARRESTER AND PRESSURE RELIEF

The general field of art to which the invention relates is that of enclosures for electrical equipment operating in an explosive gaseous and vapor environment. In particular the invention relates to seals or sealing means having location in the flame path between an inflamed atmosphere and a potentially explosive atmosphere.

Explosionproof enclosures are required in numerous hazardous applications. They comprise in most instances a cast metal box having a cast metal cover with penetrations into the box for attachment of conduits or penetrations into the box or cover for actuating electrical arcing devices such as switches and circuit breakers disposed within the enclosure. Such enclosures may be installed as single units or they may be combined into a manifold depending upon the quantity of arcing devices required in a specific electrical installation.

The enclosures as above referred to must be capable of containing an explosion or flame ignited by an arcing device in the enclosure and preventing its propagation to the external atmosphere which is or may be combustible or explosive. Such containment has heretofore been accomplished by providing sufficient strength in the enclosure to sustain the internal explosion pressure without fracture, and by providing metal joints or discrete geometry which allow the expanded gases to escape from the enclosure but which will cool any flame to below the ignition temperature of the external atmosphere. The metal joints may consist of flat ground surfaces such as between a cover and a box, threaded couplings as between a conduit and a box, and reamed holes as between an actuator and a box or cover.

Enclosures for electrical equipment operating in hazardous environments must conform to certain established requirements. Also, the most common dangerous materials have been defined and grouped as regards their similar properties and which, therefore, give rise to similar degrees of hazard. The locations to which the present invention pertains includes those locations in which flammable gases or vapors are or may be present in the air in quantities sufficient to produce explosive or ignitable mixtures. The explosionproof electrical equipment for use in such locations is required to be of substantial construction capable of withstanding the internal pressure resulting from explosions without bursting or loosening of joints. It is also required that the enclosure shall withstand, without rupture or permanent distortion, a hydrostatic test of four times the maximum internal pressure developed during the explosion tests. Of course, the internal explosion pressure is influenced by the size and shape of the enclosure, by its free internal volume, and by the nature of the gas or vapor air mixture.

A number of basic deficiencies have existed in the types of explosionproof enclosures as heretofore employed in potentially explosive environments. In the first place the design is practically limited to castings of iron, steel, copper or aluminum. Although welded or fabricated sheet metal construction is not specifically excluded, nevertheless the provision of a suitable flame joint is extremely difficult in fabricated designs. Also, the heavy weight of metal castings precludes use of such apparatus on airborne or highly mobile equipment. Also, such enclosures as heretofore employed were not rain or water tight unless auxiliary elastomeric seals were added as supplementary to the flame joint. When such seals were added, the internal pressure from the explosion increased substantially and the enclosures had to be proportionately stronger.

The high cost of such prior explosionproof enclosures inhibited their use, whereas their specialized nature in design increased the quantity of variations resulting in decreased unit production. The flame paths were susceptible to corrosion, scratching or other damage which destroyed their functionality. Maintenance was rendered difficult and loss of explosionproof integrity was not evident in the field. For example, loss of explosionproof integrity through changes such as warpage was not evident or inspectable.

In view of the foregoing the main objective of the present invention is to provide an explosionproof enclosure which has unusually high performance characteristics in the functional area of flame arrest and pressure relief.

A further object of the invention is to provide an improved enclosure that can be fabricated from roll sheet metal or molded polymeric materials without diminishing the advantages which are provided by cast metal enclosures with ground or machined flame joints.

Another object is to provide a flame arrester that can be fabricated independently of the enclosure and which will be capable of attachment to any suitable enclosure, thus making the same suitable for use in potentially explosive environments.

A further object of the invention is to provide a flame arrester which will be resilient and which will have the ability to compensate for distortion and discontinuities in the flange or butting faces of the enclosure components.

Another object is to provide a flame arrester which will incorporate a water seal as a unitary feature so that water will be excluded from entrance into the enclosure.

Another object is to provide an enclosure with a flame joint which can be readily inspected for functionality and which may be replaced in order to restore the functionality and safety of the enclosure when the original flame joint has been damaged.

Another object is to provide a unitary flame arrester, pressure relief and water seal which will be inherently corrosion resistant and unaffected by hazardous gases or vapors.

A further object of the invention is to provide a nonseizing, self-lubricated, low friction bearing in the flame joint between an actuator and its penetration into an enclosure.

With these and various other objects in view the invention may consist of certain novel features of construction and operation, as will be more fully described and particularly pointed out in the specification, drawings and claims appended thereto.

In the drawings which illustrate an embodiment of the device and wherein like reference characters are used to designate like parts -

FIG. 1 is an elevational view of a unitary flame arrester, pressure relief and water seal constructed in accordance with and which embodies the improvements of the present invention;

FIG. 2 is a sectional view showing the unitary flame arrester, pressure relief and water seal as applied to an enclosure;

FIG. 3 is a view illustrating diagrammatically the preferred alignment of the spheres of the flame arrester wherein the lines connecting the centers of the spheres describe and equilateral pyramid;

FIG. 4 is a view showing an undesired but possible alignment of the spheres linearly;

FIG. 5 is a view perpendicular to the flame path as shown in FIG. 4;

FIG. 6 is a view similar to FIG. 3 but showing the flame path pore;

FIG. 7 is an enlarged view of the flame path pore;

FIG. 8 is a chart illustrating values of pore size for a selected flame path for a number of chemical materials;

FIG. 9 is a chart showing that the pressure at any instant in an enclosure is the difference between the rate at which the pressure is being generated by combustion and the rate at which the gas mass is being expelled through the flame arrester; and FIGS. 10, 11 and 12 are sectional views showing the flame arrester of the invention as applied to the entrance openings of an enclosure for rendering the same explosionproof.

Reference is made to the drawings and particularly to FIGS. 1 and 2, wherein it will be observed that the invention relates to an explosionproof enclosure which essentially consists of a fabricated cast or molded box 20, a fabricated or molded cover 21 with means for fastening the same to the box, and a resilient flame arrester identified in its entirety by numeral 22.

In accordance with the invention the flame arrestor also has utility as a pressure relief and as a water seal. The box, cover and attachments thereto may be fabricated or cast in metal or molded of reinforced polymeric plastic materials. The flame arrester 22 is generally quadrilateral in cross section as best shown in FIG. 1 and the same is porous in one direction so as to permit flow of gases through the same in a horizontal transverse direction. However, in a direction generally perpendicular to the porous direction the flame arrester is impervious. Also, it will be understood that the flame arrester is interposed in a continuous configuration, without discontinuity, between any two parts of the enclosure such as would result in a space capable of communication between the environment within the enclosure and the environment external to the enclosure. The flame arrester may thus take the form of a gasketlike structure between a cover and a box as shown in FIG. 10, or a ring surrounding a shaft as shown in FIG. 11, or a glandlike element between a box and an attachment to the box such as the conduit or cable shown in FIG. 12. In a typical installation one impervious face abuts one side of the flame joint and the other impervious face abuts the opposite side of the flame joint. The porous faces of the flame arrester are exposed to the atmosphere internal and external of the enclosures so as to constrain the flame and cause the expanding gases resulting from the explosion to flow through the porous path provided by the flame arrester.

One construction of unitary flame arrester, pressure relief and water seal is shown in FIGS. 1 and 2 wherein a plurality of spheres or balls 23 are bonded to each other at all points of tangent contact with a flexible or semiflexible polymer such that the section is generally quadrilateral. The top and bottom faces of the flame arrester are laminated at 24 and 25 with a discrete thickness of similar polymer materials or other suitable plastic. The spheres 23 may be of metal coated with a layer of polymer or the said spheres may be made entirely of resilient or semiresilient polymer provided that they have a higher compression deformation strength than the polymer laminate. This latter requirement is necessary in order to provide a substantive body to the flame arrester so as to maintain porosity in the structure, whereas the polymer laminate must have sufficient flexibility to effectively seal against the metal of the enclosure regardless of the imperfections and variations in the metal surface. Additionally, the attachment point between the spheres must have a reasonable degree of flexibility to allow flexible movement of the spheres relative to each other in such a manner that the entire flame arrester has a degree of flexibility to compensate for variations in the enclosure and avoid the brittleness inherent in structures made of porous metals or porous ceramics.

The material forming the laminates 24 and 25 may preferably comprise polytrifluorochloroethylene. The said elements are molded into the desired shape in a mold at approximately 500° Fahrenheit and under a pressure ranging from 15,000 to 20,000 pounds per square inch. The spheres or balls 22 may be formed of stainless steel and which are coated with the plastic by spraying or tumbling. The articles are then sintered individually at about 500° to 600° Fahrenheit in a suitable oven with the spheres maintained in constant motion on a nickel or nickel-plated surface to provide a uniform coating.

For constructing the flame arrester as shown in FIGS. 1 and 2, one laminate such as 25 is placed in the bottom of a cavity as provided by a mold of the desired size and shape and the cavity is approximately filled with the coated spheres with sufficient space being left for the placing of the second laminate 24 on the top of the spheres, thus filling the mold. The cover section of the mold is then deposited in place and the structure is placed in a typical molding press. The mold sections are placed under approximately 250 pounds per square inch pressure with the temperature being elevated to about 700° Fahrenheit. This results in all the contacting surfaces of the laminates and the spheres fusing together. Upon being removed from the mold the spheres and the top and bottom laminates as covers comprise a structural entity which can be handled and attached to an enclosure.

An alternative construction of flame arrester involves the substitution of polyfluorosiloxane as the polymer for the polytrifluorochloroethylene previously described and wherein the top and bottom laminates are formed of the said polymer with the stainless steel balls being coated therewith. The laminates can be molded by compression or transfer molding techniques in a suitable molding press at approximately 2,500 pounds per square inch pressure and at a temperature of about 280° Fahrenheit. The polymerization is arrested at a stage that is short of complete so as to provide reaction points in the structure of the polymers for the later bonding process.

The stainless steel balls 23 can be coated with the polyfluorosiloxane as a 30-percent dispersion in methyl-ethyl-ketone by spraying or tumbling. The coating is desolvated and polymerized using thin film techniques such as an autoclave charged with high-pressure steam at about 300° Fahrenheit. Here also the polymerization is arrested so as to provide reaction points for the later bonding operation.

The mold and process for constructing the flame arrester according to this modification is similar to that previously described except that the mold is designed to contain high-pressure steam at about 325° Fahrenheit and which is injected to provide a dense high transfer rate medium for the heat necessary to reactivate the polymerization process. As the siloxane is reactivated and the polymerization is completed, a homogeneous bond is created between adjacent spheres and between the spheres and the siloxane laminates, thereby completing the construction of the flame arrester as a structural entity.

Another construction method for the flame arrester and pressure relief device consists of a porous cellular fluoroplastic such as vinylidene fluoride disposed between two relatively thin laminations which may be formed of flexible metal. More particularly, the laminations may consist of stainless steel ranging from 0.003 to 0.010 inch in thickness and which is die-cut or formed to the shape and configuration required for the enclosure. One or both faces of each of the two laminates is spray coated with a plastic as mentioned and sintered in an oven. For the porous interlaminate, and which is substituted for the spheres as previously described, this further construction method contemplates the use of sheets of commercially available porous cellular vinylidene fluoride and wherein the sheets are die-cut to the required size and shape.

In the construction of such a flame arrester the metal laminates are placed in contact with the porous interlaminate so that the plastic-coated faces abut the porous interlaminate. The assembly is then placed between two platens and subjected to approximately 10 pounds per square inch pressure at a temperature of about 700° Fahrenheit to cause the contacting surfaces to fuse. The flame arrester as so constructed is sufficiently flexible to compensate for variations in the enclosure. The structure also provides an interface to the enclosure which is closely in accordance with the present standards requirements.

A further construction method for the flame arrester and pressure relief of the invention consists in metal laminates which may be coated with polyfluorosiloxane or with polytrifluorochloroethylene, and wherein metal spheres or balls such as 23 are employed, the same being coated with either of said plastics. Additional plastics and materials coming within the purview of the invention and which may be used as a coating or for fabricating the spheres entirely therefrom include polytetrafluoroethylene, fluorinated ethylene propylene, polyvinylidene fluoride, epichlorohydrin, chloronated polyether, polyimide and silica or glass particles. The laminates may be of the same material or other resilient materials can be used provided that bonding of the laminates or spheres can be accomplished with a differential in hardness existing between the spheres and the laminates.

The functional performance of the flame arrester, pressure relief and water seal device of the invention is predicated on a number of parameters such as the material used in the spheres and laminates, the size of the spheres which is indicated by C, the size of the pores indicated by P, the pore area in a plane perpendicular to the flame path indicated by A and which is equal to B × L as shown in FIG. 1, and the pore length in a plane parallel to the flame path, the same being indicated by W. These parameters are interrelated to accomplish the desired functions including flame resistance, flame arrest, pressure relief and water and rain sealing.

For flame resistance the materials used in the flame arrester must be temperature resistant under abnormal operating conditions, nonignitable and nonflame supporting when activated by an internal explosion or by an electrical arc. The materials must be chemically and physically resistant to hazardous gases, vapors and liquids. As typical of such hazardous fluids the following may be mentioned; acetylene, manufactured gas, hydrogen gas, ethyl-ether, ethylene, gasoline, benzine, butane, propane, alcohol and acetone.

In regards to the ability of the present device to arrest the flame caused by the explosion, the pore size of the sphere design must be considered. The spheres align themselves during fabrication in a random fashion such that lines connecting the centers of the spheres will describe an equilateral pyramid as shown in FIG. 3. However there exists a possibility that the spheres may align themselves linearly as illustrated in FIG. 4 and it will be appreciated that such alignment represents the worst case condition since the shortest, least tortuous flame path results. Accordingly, the flame arrest calculations are based on this condition. FIG. 5 is a view perpendicular to the flame path and FIG. 6 illustrates the flame path pore with an enlarged view of the flame path pore being shown in FIG. 7. In determining the pore area in terms of the sphere diameter the following formula can be employed:

$$\text{Pore area} = \frac{C^2\sqrt{3}}{4} - \frac{\pi C^2}{8} = C^2\left(\frac{\sqrt{3}}{8} - \frac{\pi}{8}\right) = .0403C^2$$

For determining the maximum dimension of the pore also in terms of the sphere diameter the following formula can be employed:

$$H = \frac{C\sqrt{3}}{2} - \frac{C}{2} = C\left(\frac{\sqrt{3}}{2} - \frac{1}{2}\right) = .366C$$

The chart shown in FIG. 8 illustrates the acceptable and unacceptable pore size for a selected length of flame path for a number of inflammable materials. Pressure relief is accomplished as a function of relief area, that is, total pore area, pressure and time in the relationship as shown in FIG. 9. Referring to said figure the pressure in an enclosure at any instant of burning without pressure relief can be found from the following formula $P_B = 0.032ti((TV)/L)$
wherein:
 $P$ = Internal Pressure, p.s.i.
 $ti$ = Time Instant, seconds
 $T$ = Temperature of combustion of the gas (rankin)
 $V$ = Burning velocity of the gas in seconds
 $L$ = The largest dimension of the enclosure in inches.

Since the time to burn the entire volume of gas is determined by $t = (0.866L)/V$
the final pressure at complete combustion is provided by
$$P = 0.0276T.$$

Certain simplifications have been made in the above equations in order to present the concept clearly. Effects of turbulence, chemical reaction, enclosure geometry and heat transfer have been omitted from the equations presented. Inclusions of such additional variables may be made in accordance with established gas or combustion technology using data in any of several handbooks in common use.

The flame arrester is relieving the enclosure pressure simultaneously with the combustion of the gas in the enclosure. The flow of gas through the arrester is proportional to the pressure of the gas and the pore area of the arrester according to well-known formula of gas flow through orifices. This proportion, simplified for the present purposes is provided by the following formula:

$$W = \frac{.26\, Pat}{\sqrt{T}}$$

wherein:
 $W$ = Pounds of gas flowing through the arrester;
 $P$ = Enclosure pressure, PSIA
 $t$ = Absolute temperature of the gas (rankin)
 $A$ = Pore area of the arrester in square inches.

The pressure at any instant in the enclosure is the difference between the rate at which the pressure is being generated by combustion and the rate at which the gas mass is being expelled through the arrester all as illustrated in FIG. 9. It may be seen that by varying the pore area of the arrester, the internal pressure of the enclosure can be varied from a minimum equal to the kinetic force exerted by an expanding gas in free air to the maximum force which results from no pressure relief area.

The strength of the enclosure must be such that it will contain the explosion and can be demonstrable by a hydrostatic test which is equal to four times the recorded explosion pressure observed for that specific enclosure. It is axiomatic that the explosion pressure resulting from an unrelieved enclosure requires an explosion considerably stronger than that resulting from an enclosure which is relieved.

In the enclosures of FIGS. 10, 11 and 12 the interior space is relieved by the flame arrester of the invention and wherein the dimension D is equal in area to the pore area of the flame arrester. In FIG. 10 the flame arrester as a structural entity is supported by the inside bracket 26 fixed to the box or container 20 and the same extends around the opening D in contact with the lid or cover 21. In FIG. 11 the box or container 20 is provided with an actuator or shaft 27 and the flame arrester is disposed around the same in concentric relation and with the space D also being equal to the pore area. The same is true as regards the structure of FIG. 12 wherein provision is made for a cable such as 28 to enter the enclosure by employing the gland 30.

What is claimed is:

1. In a flame arrester of the character described, in combination, a structural entity that can be bodily handled and attached to an enclosure, said structural entity consisting of suitably spaced top and bottom laminates and an interposed interlaminate, said interlaminate being porous in a direction parallel to the laminations to provide a flame path, and said interlaminate being bonded to the inside contacting surfaces of the top and bottom laminates, respectively.

2. A flame arrester of the character as defined by claim 1, wherein the interlaminate consists of a porous cellular fluoroplastic.

3. A flame arrester of the character as defined by claim 1, wherein the interlaminate consists of porous cellular vinylidene fluoride, and wherein the top and bottom laminates consist of sheets of flexible metal, said interlaminate and the metal sheets being shaped to conform to the configuration required for the enclosure.

4. A flame arrestor of the character as defined by claim 1, wherein the interlaminate is formed by a plurality of spheres bonded to adjacent spheres at their contacting area by a flexible or semiflexible polymer, and wherein the top and bottom laminates are formed of a discrete thickness of similar polymer material, said spheres being so disposed in said bonded relation that the lines connecting the centers of the spheres describe an equilateral pyramid.

5. A flame arrester of the character as defined by claim 1, wherein the interlaminate is formed by a plurality of metal spheres, said spheres having a coating of a flexible or semiflexible polymer and said spheres being bonded to adjacent spheres at their contacting areas by said coating, and wherein the top and bottom laminates are formed of a discrete thickness of the same polymer material, said spheres being so disposed in said bonded relation that the lines connecting the centers of the spheres describe an equilateral pyramid.

6. In a unitary flame arrester, pressure relief and water seal, in combination, a structural entity that can be bodily handled and attached to an enclosure, said structural entity consisting of suitably spaced top and bottom laminates, and a porous interlaminate disposed between the top and bottom laminates to thereby provide a flame path, said top and bottom laminates being formed of a material selected from the class consisting of polytrifluorochloroethylene, polyfluorosiloxane, polytetrafluoroethylene, fluorinated ethylene propylene, polyvinylidene fluoride, epichlorohydrin, chlorinated polyether, polyimide, and silica or glass particles, and said porous interlaminate comprising a plurality of spheres formed of a material selected from said class, the spheres being bonded to adjacent spheres and to the inside surfaces of the top and bottom laminates to form said structural entity 7. A unitary flame arrester, pressure relief and water seal as defined by claim 6, wherein the spheres are so disposed in said bonded relation that the lines connecting the centers of the spheres describe an equilateral pyramid.

8. A unitary flame arrester, pressure relief and water seal as defined by claim 7, wherein the spheres are formed of metal, and wherein said metal spheres are coated with a plastic material selected from said class and then subjected to heat and pressure to cause the contacting areas to fuse to form the structural entity.

9. In a unitary flame arrester, pressure relief and water seal, the combination with an enclosure, of a structural entity interposed in a continuous configuration without discontinuity between any two parts of the enclosure to provide communication between the environment within and the environment external the enclosure, said structural entity consisting of suitably spaced top and bottom laminates and an interposed interlaminate, said interlaminate being porous in a direction parallel to the laminations to provide a flame path, and said interlaminate being bonded to the inside surfaces of the top and bottom laminates, respectively.

10. A unitary flame arrester, pressure relief and water seal as defined by claim 9, wherein the interlaminate is formed of a plurality of spheres in contacting relation and which are so disposed that the lines connecting the centers of the spheres describe an equilateral pyramid, whereby the pores thus formed provide the said flame path.

11. A unitary flame arrester, pressure relief and water seal as defined by claim 10, wherein the spheres are formed of a metal and are bonded to adjacent spheres, and wherein the interlaminate thus formed is bonded to the inside surfaces of the top and bottom laminates, respective.

12. A unitary flame arrester, pressure relief and water seal as defined by claim 10, wherein the spheres are formed of a plastic material selected from the class consisting of polytrifluorochloroethylene, polyfluorosiloxane, polytetrafluoroethylene, fluorinated ethylene propylene, polyvinylidene fluoride, epichlorohydrin, chlorinated polyether and polyimide.

UNITED STATES PATENT OFFICE
CERTIFICATE OF CORRECTION

Patent No. 3,607,604  Dated September 21, 1971

Inventor(s) Robert D. Nava

It is certified that error appears in the above-identified patent and that said Letters Patent are hereby corrected as shown below:

Col. 2, line 50 "and" should be "an"

Col. 3, line 1 "arrestor" should be "arrester"

Col. 3, line 38 "compression" should be "compressive"

Col. 5, line 35 formula in second instance is $\frac{8}{8}$

It should read " $\frac{8}{4\quad 8}$ "

Col. 5 about line 50 the formula is written all on one line instead of the letters "B" and "L" being written below the line.

Col. 5 also formula is on one line

Col. 6, line 7 "t" should be "T"

Signed and sealed this 9th day of May 1972.

(SEAL)
Attest:

EDWARD M. FLETCHER, JR.
Attesting Officer

ROBERT GOTTSCHALK
Commissioner of Patents